United States Patent
Ikeda

(10) Patent No.: US 10,215,363 B2
(45) Date of Patent: Feb. 26, 2019

(54) OPTICAL ELEMENT

(71) Applicant: NALUX CO., LTD., Osaka-shi, Osaka (JP)

(72) Inventor: Katsumoto Ikeda, Osaka (JP)

(73) Assignee: NALUX CO., LTD., Osaka-Shi, Osaka (JP)

( * ) Notice: Subject to any disclaimer, the term of this patent is extended or adjusted under 35 U.S.C. 154(b) by 571 days.

(21) Appl. No.: 14/983,949

(22) Filed: Dec. 30, 2015

(65) Prior Publication Data

US 2016/0109092 A1    Apr. 21, 2016

Related U.S. Application Data

(63) Continuation of application No. PCT/JP2014/053292, filed on Feb. 13, 2014.

(Continued)

(51) Int. Cl.
  *G02B 3/02*    (2006.01)
  *F21V 5/04*    (2006.01)
  *G02B 19/00*   (2006.01)

(52) U.S. Cl.
  CPC .......... *F21V 5/046* (2013.01); *G02B 19/0014* (2013.01); *G02B 19/0061* (2013.01); *F21V 5/04* (2013.01)

(58) Field of Classification Search
  CPC ....... G02B 2003/093; F21V 3/00; F21V 3/02; F21V 5/002; F21V 5/004; F21V 5/006;
  (Continued)

(56) References Cited

U.S. PATENT DOCUMENTS 7,192,166 B2  3/2007  Shimura
7,270,454 B2  9/2007  Amano
(Continued)

FOREIGN PATENT DOCUMENTS

CN    100451688 C    1/2009
EP    1 641 052 A2    3/2006
(Continued)

OTHER PUBLICATIONS

Japanese Office Action dated Jul. 15, 2014 corresponding to Japanese Patent Application No. 2014-521384.
(Continued)

*Primary Examiner* — Robert E Tallman
(74) *Attorney, Agent, or Firm* — Squire Patton Boggs (US) LLP

(57) ABSTRACT

An optical element includes a light receiving surface 101 covering a light source on a plane and an exit surface 103. When the central axis is AX, the intersection of AX with the plane is P0, and in a cross section containing AX, an angle between a line connecting P0 and P on 101 and AX is $\theta r$, an angle between a normal to 103 at Q and AX is $\phi$, a distance from AX to Q is r, the maximum value of r on 103 is $r_{max}$, and $\theta r$ and $\phi$ are positive when measured clockwise with respect to AX, $\phi$ has plural positive local maximum and minimum values as a function of r in $$0.5 r_{max} \le r,$$

in an area of 103 through which a ray travelling from P0 at a positive angle $\theta r$ passes, and the shape of 103 is symmetric with respect to AX.

14 Claims, 9 Drawing Sheets

Related U.S. Application Data

(60) Provisional application No. 61/844,495, filed on Jul. 10, 2013.

(58) Field of Classification Search
CPC . F21V 5/007; F21V 5/04; F21V 5/045; F21V 5/0048
USPC ....... 359/642, 662, 707, 708, 721, 724, 599, 359/615
See application file for complete search history.

(56) References Cited

U.S. PATENT DOCUMENTS

| | | |
|---|---|---|
| 2006/0066218 A1 | 3/2006 | Yamaguchi et al. |
| 2006/0067640 A1 | 3/2006 | Hsieh et al. |
| 2006/0077685 A1 | 4/2006 | Hsieh et al. |
| 2007/0104963 A1 | 5/2007 | Hsieh et al. |
| 2008/0112156 A1 | 5/2008 | Hsieh et al. |
| 2010/0226127 A1 | 9/2010 | Bigliatti et al. |
| 2013/0063952 A1 | 3/2013 | Ikeda et al. |
| 2013/0343035 A1 | 12/2013 | Sakai et al. |
| 2015/0029727 A1 | 1/2015 | Ikeda et al. |

FOREIGN PATENT DOCUMENTS

| | | | |
|---|---|---|---|
| EP | 2 461 381 A2 | 6/2012 | |
| EP | 2 394 193 B1 | 11/2014 | |
| EP | 2 846 179 A2 | 3/2015 | |
| JP | 2006-92983 A | 4/2006 | |
| JP | 2006-99117 A | 4/2006 | |
| JP | 2007-088093 A | 4/2007 | |
| JP | 2008-305923 A | 12/2008 | |
| JP | 2010152282 A | 7/2010 | |
| JP | 2010-186142 A | 8/2010 | |
| JP | 2012018917 A | 1/2012 | |
| JP | 2012028619 A | 2/2012 | |
| JP | 2012-069363 A | 4/2012 | |
| JP | 2012-138208 A | 7/2012 | |
| JP | 2012-517037 A | 7/2012 | |
| JP | 2012-252994 A | 12/2012 | |
| JP | 2013-061399 A | 4/2013 | |
| JP | 2013-115079 A | 6/2013 | |
| JP | 2013-115079 A1 | * | 6/2013 |
| JP | 5283101 B1 | 9/2013 | |
| JP | 2014-06967 A | 1/2014 | |
| JP | 2014-022126 A | 2/2014 | |
| JP | 2014-038233 A | 2/2014 | |
| WO | WO 2010/091097 A1 | 8/2010 | |
| WO | WO 2012/073398 A1 | 6/2012 | |
| WO | WO 2014/033985 A1 | 3/2014 | |

OTHER PUBLICATIONS

International Search Report and Written Opinion dated Mar. 25, 2014 corresponding to International Patent Application No. PCT/JP2014/053292 and English translation thereof.

Chinese Office Action application No. 201480035593.3 dated Mar. 28, 2017.

* cited by examiner

OPTICAL ELEMENT

CROSS REFERENCE TO RELATED APPLICATION

This is application is a Continuation of International Patent Application No. PCT/JP2014/053292 filed Feb. 13, 2014, which designates the U.S. and was published under PCT Article 21(2) in English, and which claims priority from U.S. Provisional Patent Application No. 61/844,495, dated Jul. 10, 2013. The contents of these applications are hereby incorporated by reference.

BACKGROUND

Field

The present invention relates to an optical element that is configured to diverge lights from the light source.

Description of the Related Art

Recently LED (light emitting diode) light sources have been widely used. Since a large portion of lights of a LED light source is emitted toward the front, an optical element that is configured to diverge lights from the LED light source is commonly used in a combination with the LED light source. Particularly, when LED light sources are used as light sources of an illumination unit for illuminating a large area, such as that for backlight, optical elements that are configured to diverge lights from the LED light sources over a large angle are used such that a compact illumination unit can be realized with a small number of LED light sources (for example, Patent Document 1).

An LED light source designed for a large amount of light consists of a light emitting chip for emitting shorter-wavelength lights such as blue light and a fluorescent material which emits longer-wavelength fluorescence such as green, yellow or red. In many cases, in such a LED light source, the light emitting chip for emitting shorter-wavelength lights is arranged at the center while the fluorescent material which emits longer-wavelength fluorescence is arranged around the light emitting chip. In such an LED light source, the position of the portion emitting shorter-wavelength lights and the position of the portion emitting longer-wavelength lights are dissimilar from each other. Accordingly, when the optical device is used to diverge lights from the light source, in some cases there exist directions in which shorter-wavelength lights are stronger and directions in which longer-wavelength lights are stronger. As a result, in some cases the color of light may become bluish in some directions while the color of light may become reddish in other directions. That is, the color of light may vary depending on the direction. For the use in illumination units, it is not preferable that color of light varies depending on the direction. However, an optical element that is configured to diverge lights from the light source, and that can reduce color difference of lights which occurs due to direction, has not been developed so far.

Patent Document 1: JP2006-92983A (JP3875247B)

Accordingly, there is a need for an optical element that is configured to diverge lights from the light source, and that can reduce color difference of lights which occurs due to direction.

SUMMARY

An optical element according to the first aspect of the present invention includes a light receiving surface which covers a light source arranged on a plane and an exit surface which covers the light receiving surface, the optical element being configured such that lights from the light source passes through the light receiving surface and the exit surface and goes to the outside for illumination. When the central axis of the optical element is designated as an optical axis, the point of intersection of the optical axis with the plane is designated as a point P0, and in a cross section of the optical element, the cross section containing the optical axis and being perpendicular to the plane, an angle which a line connecting the point P0 and a point on the light receiving surface forms with the optical axis is designated as $\theta r$, an angle which a normal to the exit surface at a point Q on the exit surface forms with the optical axis is designated as $\phi$, a distance from the optical axis to the point Q is designated as r, the maximum value of distance from the optical axis to a point on the exit surface is designated as r, and a value of $\theta r$ and a value $\phi$ are designated as positive when measured clockwise with respect to the optical axis, the exit surface is configured such that $\phi$ has plural local minimum values and plural local maximum values as a function of r in the range of $$0.5 r_{max} \leq r,$$

and the plural local minimum values and the plural local maximum values are positive in an area of the exit surface through which a ray that is emitted from the point P0 and travels at a positive angle of $\theta r$ passes, and the shape of the exit surface is symmetric with respect to the optical axis.

In the optical element according to the present aspect, since the exit surface is configured such that $\phi$ has plural local minimum values and plural local maximum values as a function of r, lights which pass through the area of the exit surface provided with the local maximum values and the local minimum values are scattered in various directions, and therefore a tendency that intensity of lights having specific wavelengths is greater in some directions is released.

Accordingly, the optical element according to the present aspect is capable of reducing a difference in color among directions.

In the text of specification and claims, local minimum values of $\phi$ as a function of r include those corresponding to bottoms of valleys of $\phi$. Local maximum values of $\phi$ as a function of r include those corresponding to crests of hills of $\phi$.

A difference in color among directions is greater in lights emitted by the outer region of the optical element than in lights emitted by the region around the central axis of the optical element.

The optical element according to the present aspect is provided with an area which is provided with local maximum values and local minimum values for scattering lights passing through the area in various directions, that is, a scattering area in the range of $$0.5 r_{max} \leq r$$

of the exit surface. Accordingly, the optical element according to the present aspect is capable of reducing a difference in color among directions effectively.

Further, in the optical element according to the present aspect, the scattering area exists only in the range of $$0.5 r_{max} \leq r$$

and does not exist around the central axis. Accordingly, lights which pass through the area of the exit surface around the central axis are diverged so as to go away from the central axis without being affected by the scattering area.

In the present aspect, the shape of the exit surface is symmetric with respect to the optical axis. Accordingly, the optical element according to the present aspect can be easily manufactured.

Thus, the optical element according to the present aspect diverges lights which pass through the area of the exit surface around the central axis so as to go away from the central axis and scatters lights which pass through the outer region of the exit surface, thereby reducing a difference in color among directions effectively.

In an optical element according to a first embodiment of the present aspect, the exit surface is configured such that the number of the plural local minimum values is at least eight and the number of the plural local maximum values is at least eight.

The optical element according to the present embodiment is capable of reducing a difference in color among directions more effectively, because the exit surface is configured such that the number of the plural local minimum values is at least eight and the number of the plural local maximum values is at least eight.

In an optical element according to a second embodiment of the present aspect, the exit surface is configured such that a relationship $$\Delta\phi \leq 20 \text{ degrees}$$

is satisfied when a difference between two values of $\phi$ which correspond to a local maximum value and a local minimum value which are adjacent to each other among the plural local minimum values and the plural local maximum values is designated as $\Delta\phi$.

If $\Delta\phi$ is too large when $\phi$ is positive, the light-diverging function of the optical element deteriorate. In the present embodiment, the light-diverging function of the optical element is maintained, and a difference in color among directions can be effectively reduced, because $\Delta\phi$ is appropriately determined.

An optical element according to a third embodiment of the present aspect is an optical element of the second embodiment, in which the exit surface is configured such that a relationship $$\Delta\phi \leq 15 \text{ degrees}$$

is satisfied.

In the present embodiment, the degree of deterioration of the light-diverging function of the optical element is further reduced.

In an optical element according to a fourth embodiment of the present aspect, the exit surface is configured such that a relationship $$\Delta r/r_{max} \leq 0.05$$

is satisfied when the maximum distance of a point on the exit surface from the optical axis is designated as $r_{max}$, and a difference between two values of r which correspond to a local maximum value and a local minimum value which are adjacent to each other among the plural local maximum values and the plural local minimum values is designated as $\Delta r$.

In the present embodiment, a difference in color among directions can be more effectively reduced, because $\Delta r$ is appropriately determined.

An optical element according to a fifth embodiment of the present aspect is an optical element of the second embodiment, in which the exit surface is configured such that a relationship $$0.01 \leq \Delta r_{max}/r_{max} \leq 0.05$$

is satisfied when the maximum value of $\Delta r$ is designated as $\Delta r_{max}$.

In the present embodiment, a difference in color among directions can be more effectively reduced, because $\Delta r$ is appropriately determined.

An optical element according to the second aspect of the present invention, includes a light receiving surface which is configured to cover a light source arranged on a plane and an exit surface which covers the light receiving surface, the optical element being configured such that lights from the light source passes through the light receiving surface and the exit surface and goes to the outside for illumination. When the central axis of the optical element is designated as an optical axis, the point of intersection of the optical axis with the plane is designated as a point P0, the point of intersection of the optical axis with the light receiving surface is designated as O1 and in a cross section of the optical element, the cross section containing the optical axis and being perpendicular to the plane, an angle which a line connecting the point P0 and a point P on the light receiving surface forms with the optical axis is designated as $\theta r$, the direction of a ray which leaves the optical element after having traveled from the point P0 to the point P forms with the optical axis is designated as $\theta e$, and the point P is moved from the point O1 along the light receiving surface, the optical element is configured such that $\theta e$ has plural local minimum values and plural local maximum values as a function of $\theta r$ in the range of $$60 \text{ degrees} \leq \theta e,$$

and the shape of the exit surface is symmetric with respect to the optical axis.

A difference in color among directions is generated mainly in lights which satisfy $$60 \text{ degrees} \leq \theta e.$$

The optical element according to the present aspect is configured such that $\theta e$ has plural local minimum values and plural local maximum values as a function of $\theta r$ in the range of $$60 \text{ degrees} \leq \theta e,$$

and therefore a difference in color among directions can be reduced effectively.

In the present aspect, the shape of the exit surface is symmetric with respect to the optical axis. Accordingly, the optical element according to the present aspect can be easily manufactured.

An optical element according to a first embodiment of the present aspect is an optical element of the present aspect, in which the optical element is configured such that the maximum value of a difference $\Delta\theta e$ between a local maximum value and a local minimum value which are adjacent to each other among the plural local minimum values and said the plural local maximum values of $\theta e$ is 5 degrees or more.

The optical element according to the present embodiment is configured such that a difference $\Delta\theta e$ between a local maximum value and a local minimum value of $\theta e$ which are adjacent to each other is 5 degrees or more, and therefore a difference in color among directions can be reduced more effectively.

An optical element according to a second embodiment of the present aspect is configured such that the maximum value of $\Delta\theta e$ is 15 degrees or less.

The optical element according to the present embodiment is configured such that the maximum value of $\Delta\theta e$ is 15 degrees or less, and therefore a difference in color among directions can be reduced more effectively while the light-diverging function of the optical element is maintained.

An optical element according to another embodiment of the present invention is divided into circular sectors around the central axis AX and the exit surface has different shapes in the respective circular sectors.

According to the present embodiment, light distribution can be changed depending on directions which correspond to circular sectors around the central axis.

An optical element according to another embodiment of the present invention is divided into circular sectors around the central axis AX and the exit surface has a shape recited in any one of the aspects and embodiments only in some of the circular sectors.

According to the present embodiment, a difference in color among directions can be reduced only in some of the circular sectors.

In an optical element according to another embodiment of the present invention, the surface portion of the exit surface includes a scattering material in the range of $0.5r_{max} \le r$.

In the optical element according to the present embodiment, the surface portion of the exit surface includes a scattering material in the range of $0.5r_{max} \le r$, and therefore a difference in color among directions can be reduced more effectively.

DETAILED DESCRIPTION

Figure 1A:
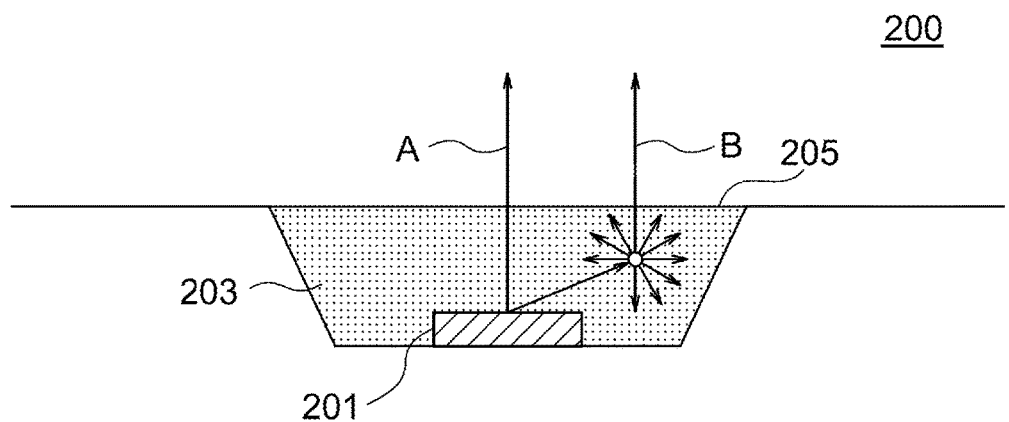
FIGS. 1A and 1B show an example of a LED light source used with an optical element according to the present invention.
Figure 1B:
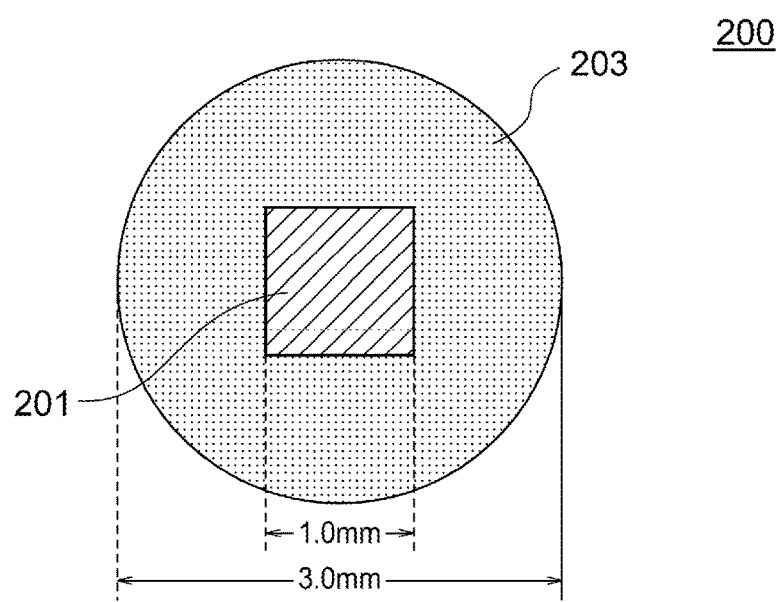

FIGS. 1A and 1B show an example of a LED light source 200 used with an optical element according to the present invention. FIG. 1A shows a cross section perpendicular to the light-emitting surface of the LED light source 200. FIG. 1B shows a plan view of the LED light source 200. In general, an LED light source designed for a large amount of light consists of a light emitting chip for emitting shorter-wavelength lights such as blue light and a fluorescent agent which emits longer-wavelength fluorescence such as green, yellow or red. In FIGS. 1A and 1B, a light emitting chip 201 of blue light is arranged at the center of the LED light source 200 while a fluorescent agent 203 is arranged in an area which is larger than the area occupied by the light emitting chip such that the fluorescent agent 203 covers the light emitting chip 201. In the plan view of FIG. 1B, the light emitting chip 201 is a square with sides of 1.0 millimeter while the fluorescent agent 203 is shaped as a circle with a diameter of 3.0 millimeters. A blue ray A is emitted by the light emitting chip 201 located around the center. A ray B of a longer-wavelength is emitted by the fluorescent agent arranged in an area which includes the periphery of the LED light source. In a LED light source having such a structure as shown in FIGS. 1A and 1B, the location where blue rays are emitted and the location where rays of longer-wavelengths are emitted are dissimilar from each other.

Figure 2:
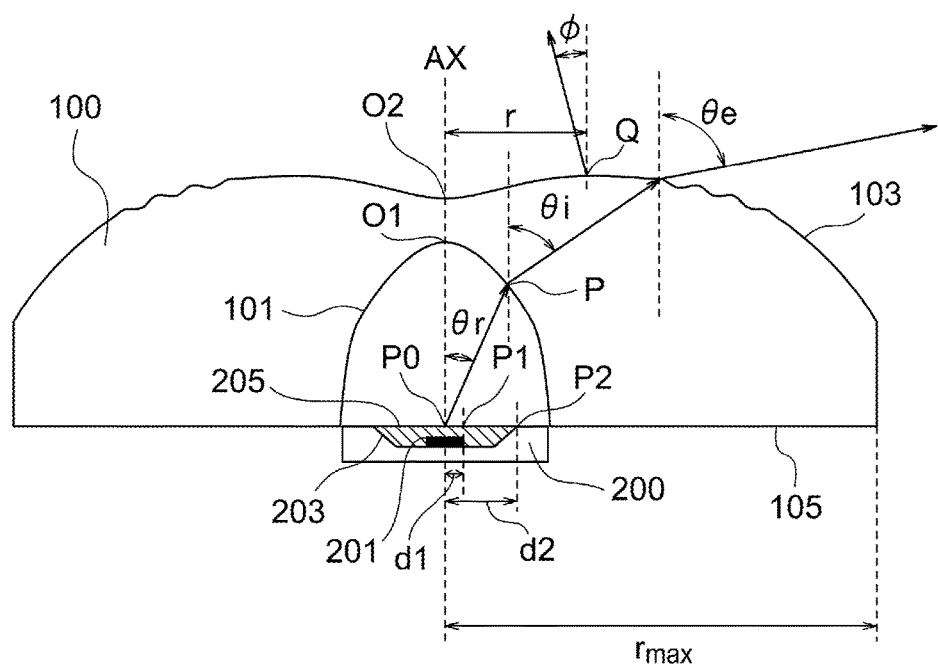
FIG. 2 shows a cross section of an optical element used to diverge lights from the LED light source according to an embodiment of the present invention.

FIG. 2 shows a cross section of an optical element 100 used to diverge lights from the LED light source 200 according to an embodiment of the present invention. The cross section contains the central axis AX of the optical element 100. The optical element 100 according to the present embodiment is of a shape having rotational symmetry around the central axis AX. A bottom face 105 of the optical element 100 has a concave portion around the central axis AX. The surface of the concave portion forms a light receiving surface 101. The surface of the optical element 100 besides the light receiving surface 101 and the bottom face 105 forms an exit surface 103.

The optical element 100 and the light source 200 are arranged such that the central axis AX of the optical element 100 passes through the center of the light source 200, that is, the center of the circle shown in FIG. 1B. In this case, the central axis AX forms the optical axis of the optical system including the optical element 100 and the LED light source 200. Further, in FIG. 2 the coordinates of the point of intersection of the light receiving surface 101 with the central axis AX are marked with O1 and the coordinates of the point of intersection of the exit surface 103 with the central axis AX are marked with O2.

Lights emitted by the light source 200 enter the optical element 100 through the light receiving surface 101 and go to the outside through the exit surface 103. In this case, lights emitted by the light source 200 are refracted at most portions of the light receiving surface 101 and the exit surface 103 such that the lights travel further away from the central axis AX. As a result, the lights are diverged.

In the present embodiment, the surface of the LED light source 200 is planar. However, the surface of the light source 200 does not necessarily have to be planar. The present invention can be applied to any light sources arranged on a plane, in which the position of the portion emitting shorter-wavelength lights and the position of the portion emitting longer-wavelength lights differ from each other.

The above-described plane is represented as a plane 205. The point of intersection of the plane 205 of the light source 200 with the central axis AX is designated as a point P0. The angle which a travelling direction of a ray emitted from the point P0 forms with the central axis AX is designated as θr, and the angle which a travelling direction of the ray which travels in the optical element 100 after having been refracted at the light receiving surface 101 forms with the central axis AX is designated as θi. The angle which a travelling direction of the ray which travels after having been refracted at the exit surface forms with the central axis AX is designated as θe. In FIG. 2, a foot of a perpendicular line from a point representing a side of the emitting chip 201 to the line representing the plane 205 is designated as P1, and a point at an edge of the fluorescent agent, that is, a point on the circumstance of the circle which forms the periphery of the fluorescent agent shown in FIG. 1B is designated as P2.

In the present embodiment, the distance from the central axis AX to P1 and that to P2 are designated respectively by d1 and d2, and then d1=0.5 (mm) and d2=1.5 (mm).

A shape of the exit surface around the central axis AX is not limited to convex, nor to concave. The shape may be convex, concave or planar. A shape of the exit surface which does not generate total reflection inside the lens is also preferable. In this case, when refractive index of the optical element is designated as n, an angle α between a ray travelling in the optical element and the normal to the exit surface at the point that the ray reaches the exit surface satisfies the following relationship.

$$\alpha < \sin^{-1}(1/n)$$

Further, in FIG. 2, an acute angle which a normal to the exit surface 103 at a point Q thereon forms with the central axis AX is designated as φ. An angle measured clockwise from the central axis AX is designated as positive one and an acute angle measured counterclockwise from the central axis AX is designated as negative one. In FIG. 2, the angle between the central axis AX and the normal to the exit surface 103 at the point of intersection of the exit surface 103 with the central axis AX is 0 degree.

Figure 3:
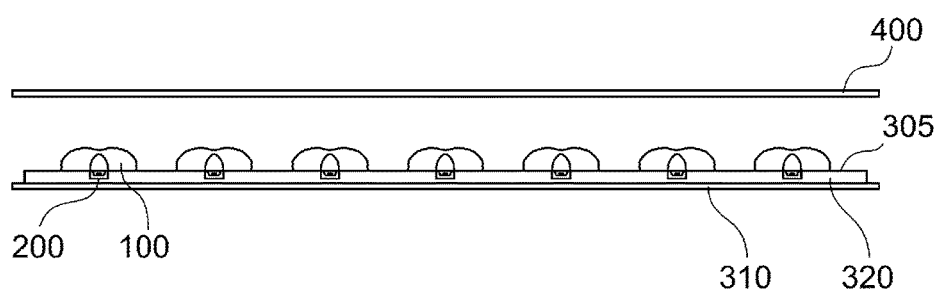
FIG. 3 shows an example of the configuration of an illumination unit in which plural sets of the light source and the optical element are arranged on a surface of a substrate.

FIG. 3 shows an example of the configuration of an illumination unit in which plural sets of the light source 200 and the optical element 100 are arranged on a surface 305 of a substrate 320. The substrate 310 and a substrate 320 are those on which the light source 200 and the optical element 100 are arranged. The illumination unit is further provided with a diffuser 400. The illumination unit permits uniform illumination on an area ahead of the illumination unit (above the illumination unit in FIG. 3).

Examples of the optical elements according to the present invention and their comparative examples will be described below. The material of the optical elements of the examples and the comparative examples is polymethyl methacrylate (PMMA), refractive index of which is 1.492 (d line, 587.56 nm) and Abbe's number of which is 56.77 (d line, 587.56 nm). Further, in the examples and the comparative examples, unit of length is millimeter unless otherwise designated.

Example 1

In the present example, the distance T between P0 and O2 is as below.

$$T=5.500 \text{ mm}$$

The distance h between P0 and O1 is as below.

$$h=4.450 \text{ mm}$$

The shape of the exit surface 103 is represented by the following equations.
When $0 \leq r < 6.8$ and $8.5 < r \leq r_{max}$, $$z = \frac{cr^2}{1+\sqrt{1-(1+k)c^2 r^2}} + \sum_{i=1}^{N} A_i r^i. \quad (1)$$

When $6.8 \leq r \leq 8.5$, $$z = \frac{cr^2}{1+\sqrt{1-(1+k)c^2 r^2}} + \sum_{i=1}^{N} A_i r^i + e^{-\omega r_t}(B \sin[\pi K r_t]). \quad (2)$$

The function z of r is defined such that Equation (1) and Equation (2) are continuously connected.
The following relationships hold.

$$c=1/R$$

$$r^2=x^2+y^2$$

"r" represents distance from the central axis AX. "$r_{max}$" represents the maximum value of r in the area of the exit surface, and $r_{max}$=9.25 (mm). "z" represents coordinate in the direction of the central axis AX with respect to the point of intersection O2 of the exit surface with the central axis AX. "c" represents curvature, "R" represents radius of curvature, "k" represents conic constant and "Ai" represents aspheric coefficient. "n" represents the ratio of the circumstance of a circle to the diameter, "B" represents amplitude and "K" represents frequency. Further, $$r_t = r - 6.8$$

Table 1 shows numerical values of coefficients and constants of Equation (1) and Equation (2) which represent the shape of the exit surface of Example 1.

TABLE 1

| | |
|---|---|
| R | 1.452 |
| k | −5.372 |
| A1 | 0.000 |
| A2 | −7.131E−02 |
| A3 | −4.205E−04 |
| A4 | 5.871E−05 |
| A5 | 2.648E−06 |
| A6 | 1.921E−08 |
| A7 | 1.819E−08 |
| A8 | 3.274E−09 |
| A9 | 4.862E−10 |
| A10 | −4.438E−10 |
| A11 | 7.082E−13 |
| A12 | −5.008E−13 |
| ω | −0.02 |
| B | 0.004 |
| K | 10 |

Figure 4:
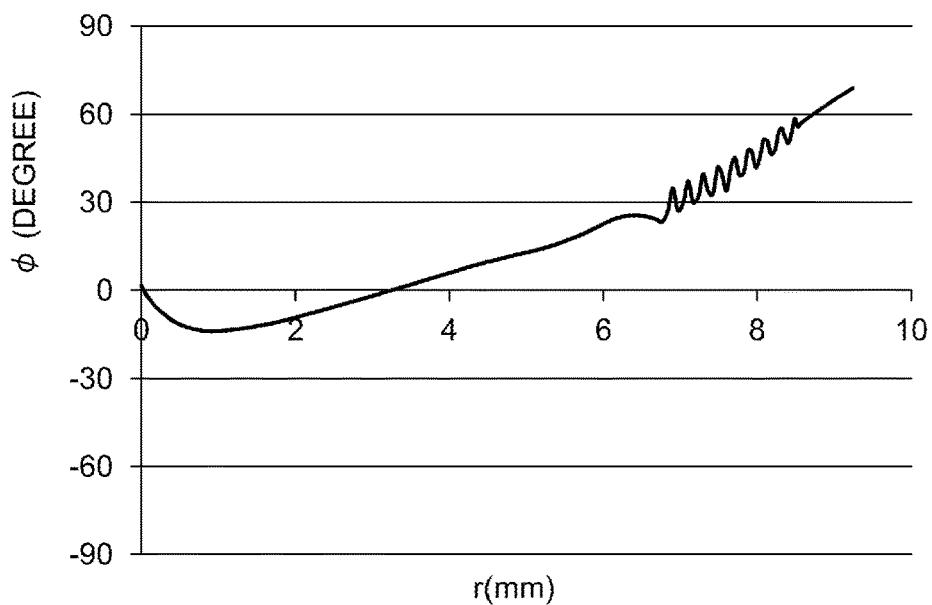
FIG. 4 represents a relationship between "r" and "φ" of the optical element of Example 1.

FIG. 4 represents a relationship between "r" and "φ" of the optical element of Example 1. The horizontal axis in FIG. 4 represents distance "r" from the optical axis AX. The vertical axis in FIG. 4 represents angle "φ" which the normal to the exit surface 103 at a point at a distance of "r" from the central axis AX forms with the central axis AX. In FIG. 2, "θr" and "φ" are designated as positive when measured clockwise with respect to the optical axis AX. "φ" in FIG. 4 is that in an area of the exit surface, through which a ray that is emitted from the point P0 and travels at an a positive angle of "θr".

In FIG. 4, when r=0, φ=0. In the range of 0<r<0.9, φ monotonously decreases with r. In the range of 0.9<r<6.5, φ monotonously increases with r.

In the range of 6.8≤r≤8.5, φ increases oscillationally with r. As described above, the function z of r is defined such that Equation (1) and Equation (2) are continuously connected. Accordingly, even in the range where r is smaller than 6.8, an oscillation is observed.

The period p of the oscillation is below.

$$p=2/K=0.2$$

When the value of p normalized by $r_{max}$ is represented as p', the following equation holds.

$$p'=p/r_{max}=0.022$$

The maximum value of the amplitude of the oscillation, that is, the maximum value of a difference between a local maximum value and a local minimum value of the function φ of r, which are adjacent to each other is 12 degrees. In the range of 6.5≤r≤8.5, there exist at least nine local maximum values and at least nine local minimum values. The above-described shape with local maximum values and local minimum values scatters lights that pass through the above-described range in various directions. Accordingly, the above-described range is called a scattering area of the exit surface 103. The above-described local maximum values and local minimum values are located in the range of 0.5 $r_{max}$≤r. The above-described local maximum values and local minimum values are positive.

In the range of 8.5<r≤$r_{max}$ φ monotonously increases with r.

The shape of the light receiving surface 101 is represented by the following equation.

$$z = \frac{cr^2}{1+\sqrt{1-(1+k)c^2r^2}} + \sum_{i=1}^{N} A_i r^i \quad (3)$$

The following relationships hold.

$$c=1/R$$

$$r^2=x^2+y^2$$

"r" represents distance from the central axis AX. "z" represents coordinate in the direction of the central axis AX with respect to the point of intersection O1 of the light receiving surface with the central axis AX. "c" represents curvature, "R" represents radius of curvature, "k" represents conic constant and "Ai" represents aspheric coefficient.

Table 2 shows numerical values of coefficients and constants of Equation (3) which represents the shape of the light receiving surface of Example 1.

TABLE 2

| | |
|---|---|
| R | −1.1353 |
| k | −0.7990 |
| A1 | 0.000 |
| A2 | −0.040 |
| A3 | 0.058 |
| A4 | 0.000 |

Figure 5:
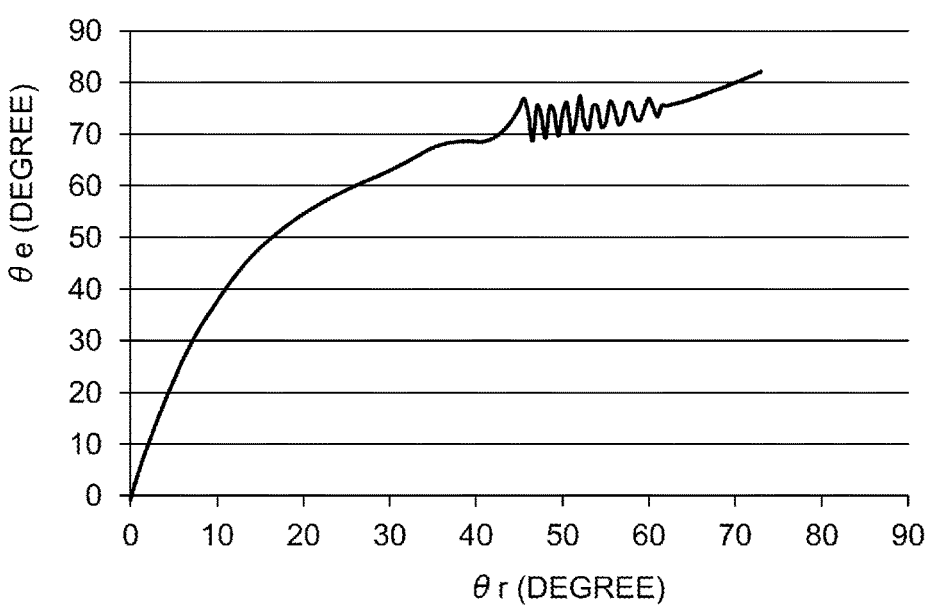
FIG. 5 represents a relationship between "θr" and "θe" of the optical element of Example 1.

FIG. 5 represents a relationship between "θr" and "θe" of the optical element of Example 1. The horizontal axis in FIG. 5 represents the angle θr which the direction of a ray emitted from the point P0 forms with the central axis AX. The vertical axis in FIG. 5 represents the angle θe which the direction of the ray which travels after having been emitted from the point P0 and then having been reflected at the exit surface forms with the central axis AX.

In FIG. 5, when θr=0, θe=0. In the range of 0<θr<40 (degrees), θe monotonously increases with θr. In the range of 40 (degrees)≤θr≤62 (degrees), θe oscillationally increases with θr. The period of the oscillation is 2 to 3 degrees. The maximum value of the amplitude of the oscillation, that is, the maximum value of a difference between a local maximum value and a local minimum value of the function θe of θr, which are adjacent to each other is 10 degrees. In the range of 40 (degrees)≤θr≤62 (degrees), there exist at least nine local maximum values and at least nine local minimum values. These local maximum values and local minimum values range from 69 degrees to 78 degrees. In the range of 62 (degrees)<θr, θe monotonously increases with θr.

Comparative Example 1

In the present comparative example, the distance T between P0 and O2 is as below.

$$T=5.500 \text{ mm}$$

The distance h between P0 and O1 is as below.

$$h=4.450 \text{ mm}$$

The shape of the exit surface is represented by Equation (1).

Table 3 shows numerical values of coefficients and constants of Equation (1) which represents the shape of the exit surface of Comparative Example 1.

TABLE 3

| | |
|---|---|
| R | 1.452 |
| k | −5.372 |
| A1 | 0.000 |
| A2 | −7.131E−02 |
| A3 | −4.205E−04 |
| A4 | 5.871E−05 |
| A5 | 2.648E−06 |
| A6 | 1.921E−08 |
| A7 | 1.819E−08 |
| A8 | 3.274E−09 |
| A9 | 4.862E−10 |
| A10 | −4.438E−10 |
| A11 | 7.082E−13 |
| A12 | −5.008E−13 |

The shape of the light receiving surface is represented by Equation (3), and coefficients and constants of Equation (3) are given in Table 2.

In other words, the shape of the light receiving surface of Comparative Example 1 is identical with that of Example 1. Further, the shape of the exit surface of Comparative Example 1 is identical with that of Example 1 except that the shape of the exit surface of Comparative Example 1 is not provided with the scattering area.

Performance Comparison Between Example 1 and Comparative Example 1

Light distribution in the case of a combination of the light source shown in FIG. 1 and the optical element of Example 1 and light distribution in the case of a combination of the light source shown in FIG. 1 and the optical element of Comparative Example 1 are compared with each other to compare performance of Example 1 and that of Comparative Example 1 with each other.

Figure 6:
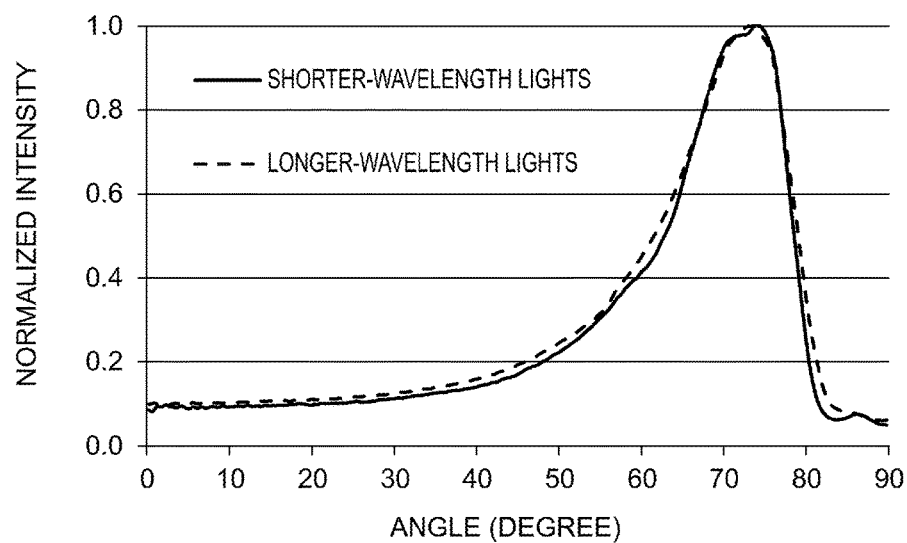
FIG. 6 shows light intensity distribution in the case of the combination of the light source shown in FIG. 1 and the optical element of Example 1.

FIG. 6 shows light intensity distribution in the case of the combination of the light source shown in FIG. 1 and the optical element of Example 1. The horizontal axis of FIG. 6 represents angle θ which a direction forms with the central axis AX. The vertical axis of FIG. 6 represents a relative value of intensity of light which is emitted in the direction which forms angle θ with the central axis AX. The solid line in FIG. 6 represents relative intensity of lights having wavelength below 500 nanometers (shorter-wavelength lights). The dashed line in FIG. 6 represents relative intensity of lights having wavelength at and above 500 nanometers (longer-wavelength lights). The relative intensity is determined such that the maximum intensity is represented as 100%.

Figure 7:
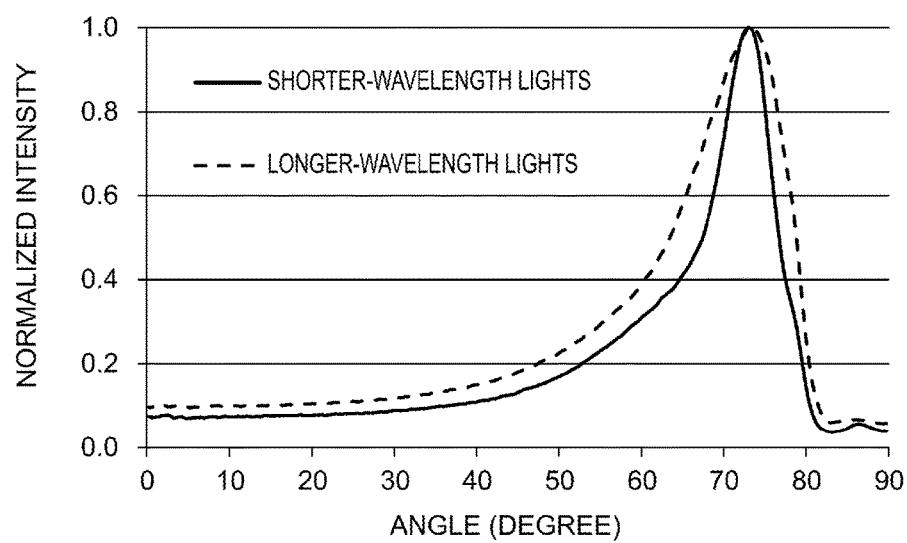
FIG. 7 shows light intensity distribution in the case of the combination of the light source shown in FIG. 1 and the optical element of Comparative Example 1.

FIG. 7 shows light intensity distribution in the case of the combination of the light source shown in FIG. 1 and the optical element of Comparative Example 1. The horizontal axis of FIG. 7 represents angle θ which a direction forms with the central axis AX. The vertical axis of FIG. 7 represents a relative value of intensity of light which is emitted in the direction which forms angle θ with the central axis AX. The solid line in FIG. 7 represents relative intensity of lights having wavelength below 500 nanometers (shorter-wavelength lights). The dashed line in FIG. 7 represents relative intensity of lights having wavelength at and above 500 nanometers (longer-wavelength lights). The relative intensity is determined such the maximum intensity is represented as 100%.

When FIG. 6 and FIG. 7 are compared with each other, a difference in intensity between shorter-wavelength lights and longer-wavelength lights in FIG. 7 concerning Comparative Example 1 is larger than that in FIG. 6. The difference between both groups of lights is remarkably large around θ of 65 degrees. When the difference between both groups of lights is large, a difference in color appears. More specifically, when the difference between both groups of lights is large around θ of 65 degrees and intensity of longer-wavelength lights is larger as shown in FIG. 7, the lights become reddish around θ of 65 degrees.

Thus, the optical element of Example 1 is capable of reducing a difference in color more effectively than that of Comparative Example 1.

Example 2

In the present example, the distance T between P0 and O2 is as below.

$T=5.536$ mm

The distance h between P0 and O1 is as below.

$h=4.536$ mm

The shape of the exit surface 103 is represented by the following equations.
When $0 \leq r < 7.0$ and $8.5 < r \leq r_{max}$, $$z = \frac{cr^2}{1+\sqrt{1-(1+k)c^2r^2}} + \sum_{i=1}^{N} A_i r^i. \quad (1)$$

When $7.0 \leq r \leq 8.5$, $$z = \frac{cr^2}{1+\sqrt{1-(1+k)c^2r^2}} + \sum_{i=1}^{N} A_i r^i + e^{-\omega r_t}(B \sin[\pi K r_t]). \quad (2)$$

The function z of r is defined such that Equation (1) and Equation (2) are continuously connected.
The following relationships hold.

$c=1/R$ $r^2=x^2+y^2$

"r" represents distance from the central axis AX. "$r_{max}$" represents the maximum value of r in the exit surface, and $r_{max}=9.25$ (mm). "z" represents coordinate in the direction of the central axis AX with respect to the point of intersection O2 of the exit surface with the central axis AX. "c" represents curvature, "R" represents radius of curvature, "k" represents conic constant and "Ai" represents aspheric coefficient. "n" represents the ratio of the circumstance of a circle to the diameter, "B" represents amplitude and "K" represents frequency. Further, $r_t = r - 7.0$ Table 4 shows numerical values of coefficients and constants of Equation (1) and Equation (2) which represent the shape of the exit surface of Example 2.

TABLE 4

| | |
|---|---|
| R | 1.452 |
| k | -5.372 |
| A1 | 0.000 |
| A2 | -7.131E-02 |
| A3 | -4.205E-04 |
| A4 | 5.871E-05 |
| A5 | 3.648E-06 |
| A6 | 1.921E-08 |
| A7 | 1.819E-08 |
| A8 | 3.274E-09 |
| A9 | 4.862E-10 |
| A10 | -4.438E-10 |
| A11 | 7.082E-13 |
| A12 | -5.008E-13 |
| ω | -0.024 |
| B | 0.004 |
| K | 10 |

Figure 8:
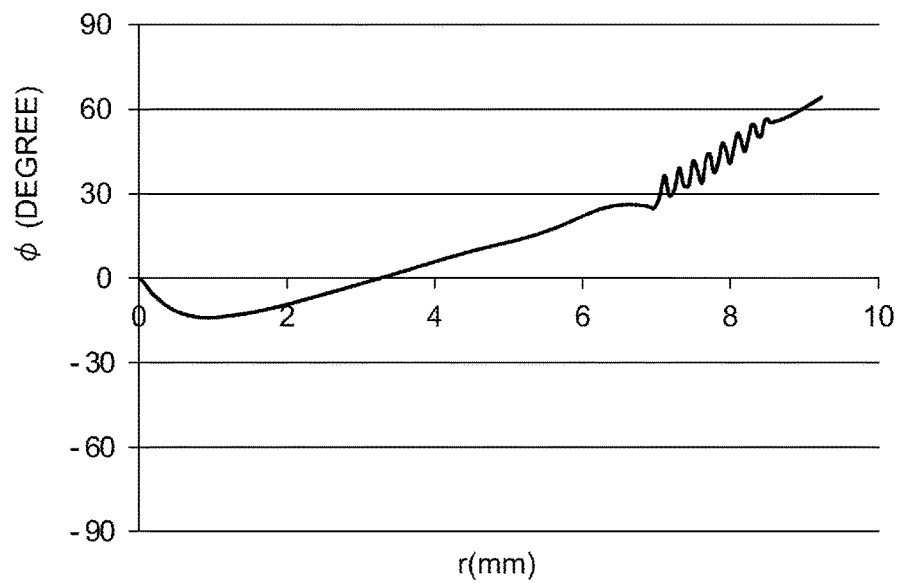
FIG. 8 represents a relationship between "r" and "φ" of the optical element of Example 2.

FIG. 8 represents a relationship between "r" and "φ" of the optical element of Example 2. The horizontal axis in FIG. 8 represents distance "r" from the optical axis AX. The vertical axis in FIG. 8 represents angle "φ1" which the normal to the exit surface 103 at a point at a distance of "r" from the central axis AX forms with the central axis AX. In FIG. 2, "θr" and "φ" are designated as positive when measured clockwise with respect to the optical axis AX. "φ" in FIG. 8 is that in an area of the exit surface, through which a ray that is emitted from the point P0 and travels at an a positive angle of "θr".

In FIG. 8, when $r=0$, $\phi=0$. In the range of $0<r<0.95$, φ monotonously decreases with r. In the range of $0.95<r<6.5$, φ monotonously increases with r.

In the range of $7.0 \leq r \leq 8.5$, φ increases oscillationally with r. As described above, the function z of r is defined such that Equation (1) and Equation (2) are continuously connected. Accordingly, even in the range where r is smaller than 7.0, an oscillation is observed.

The period p of the oscillation is below.

$p=2/K=0.2$

When the value of p normalized by $r_{max}$ is represented as p', the following equation holds.

$p'=p/r_{max}=0.022$

The maximum value of the amplitude of the oscillation, that is, the maximum value of a difference between a local maximum value and a local minimum value of the function φ of r, which are adjacent to each other is 12 degrees. In the range of 7.0≤r≤8.5, there exist at least eight local maximum values and at least eight local minimum values. The above-described range is called a scattering area of the exit surface 103. The above-described local maximum values and local minimum values are located in the range of 0.5 $r_{max}$≤r. The above-described local maximum values and local minimum values are positive.

In the range of 8.5<r≤$r_{max}$, φ monotonously increases with r.

The shape of the light receiving surface 101 is represented by the following equation.

$$z = \frac{cr^2}{1+\sqrt{1-(1+k)c^2r^2}} + \sum_{i=1}^{N} A_i r^i \quad (3)$$

The following relationships hold.

$c=1/R$ $r^2=x^2+y^2$

"r" represents distance from the central axis AX. "z" represents coordinate in the direction of the central axis AX with respect to the point of intersection O1 of the light receiving surface with the central axis AX. "c" represents curvature, "R" represents radius of curvature, "k" represents conic constant and "Ai" represents aspheric coefficient.

Table 5 shows numerical values of coefficients and constants of Equation (3) which represents the shape of the light receiving surface of Example 2.

TABLE 5

| | |
|---|---|
| R | −1.1353 |
| k | −0.758 |
| A1 | 0.000 |
| A2 | −0.040 |
| A3 | 0.058 |
| A4 | 0.000 |

Figure 9:
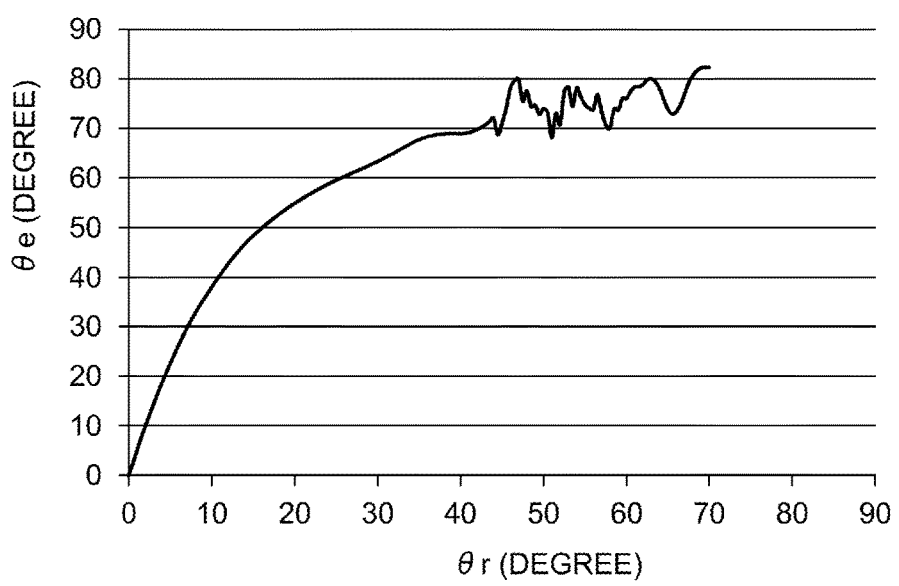
FIG. 9 represents a relationship between "θr" and "θe" of the optical element of Example 2.

FIG. 9 represents a relationship between "θr" and "θe" of the optical element of Example 2. The horizontal axis in FIG. 9 represents the angle θr which the direction of a ray emitted from the point P0 forms with the central axis AX. The vertical axis in FIG. 9 represents the angle θe which the direction of the ray which travels after having been emitted from the point P0 and then having been reflected at the exit surface forms with the central axis AX.

In FIG. 9, when θr=0, θe=0. In the range of 0<θr<40 (degrees), θe monotonously increases with θr. In the range of 40 (degrees)≤θr≤70 (degrees), θe is oscillational as θr increases. The period of the oscillation is 1 to 2 degrees. The maximum value of the amplitude of the oscillation, that is, the maximum value of a difference between a local maximum value and a local minimum value of the function θe of θr, which are adjacent to each other is approximately 10 degrees. In the range of 40 (degrees)≤θr≤70 (degrees), there exist at least ten local maximum values and at least ten local minimum values. These local maximum values and local minimum values range from 69 degrees to 80 degrees.

Comparative Example 2

In the present comparative example, the distance T between P0 and O2 is as below.

$T$=5.536 mm

The distance h between P0 and O1 is as below.

$h$=4.536 mm

The shape of the exit surface is represented by Equation (1).

Table 6 shows numerical values of coefficients and constants of Equation (1) which represents the shape of the exit surface of Comparative Example 2.

TABLE 6

| | |
|---|---|
| R | 1.452 |
| k | −5.372 |
| A1 | 0.000 |
| A2 | −7.131E−02 |
| A3 | −4.205E−04 |
| A4 | 5.871E−05 |
| A5 | 3.648E−06 |
| A6 | 1.921E−08 |
| A7 | 1.819E−08 |
| A8 | 3.274E−09 |
| A9 | 4.862E−10 |
| A10 | −4.438E−10 |
| A11 | 7.082E−13 |
| A12 | −5.008E−13 |

The shape of the light receiving surface is represented by Equation (3), and coefficients and constants of Equation (3) are given in Table 5.

In other words, the shape of the light receiving surface of Comparative Example 2 is identical with that of Example 2. Further, the shape of the exit surface of Comparative Example 2 is identical with that of Example 2 except that the shape of the exit surface of Comparative Example 2 is not provided with the scattering area.

Performance Comparison Between Example 2 and Comparative Example 2

Light distribution in the case of a combination of the light source shown in FIG. 1 and the optical element of Example 2 and light distribution in the case of a combination of the light source shown in FIG. 1 and the optical element of Comparative Example 2 are compared with each other to compare performance of Example 2 and that of Comparative Example 2 with each other.

Figure 10:
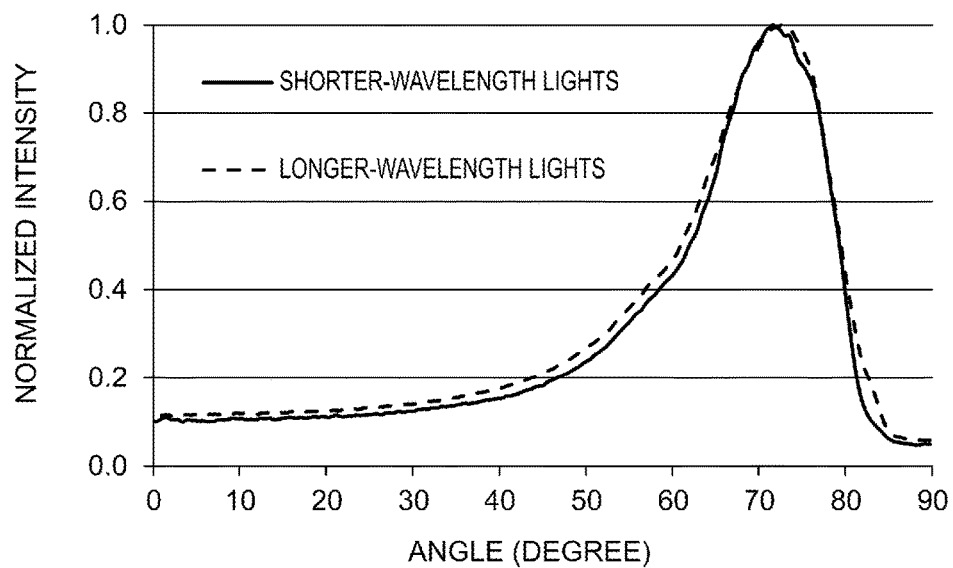
FIG. 10 shows light intensity distribution in the case of the combination of the light source shown in FIG. 1 and the optical element of Example 2.

FIG. 10 shows light intensity distribution in the case of the combination of the light source shown in FIG. 1 and the optical element of Example 2. The horizontal axis of FIG. 10 represents angle θ which a direction forms with the central axis AX. The vertical axis of FIG. 10 represents a relative value of intensity of light which is emitted in the direction which forms angle θ with the central axis AX. The solid line in FIG. 10 represents relative intensity of lights having wavelength below 500 nanometers (shorter-wavelength lights). The dashed line in FIG. 10 represents relative intensity of lights having wavelength at and above 500 nanometers (longer-wavelength lights). The relative intensity is determined such that the maximum intensity is represented as 100%.

Figure 11:
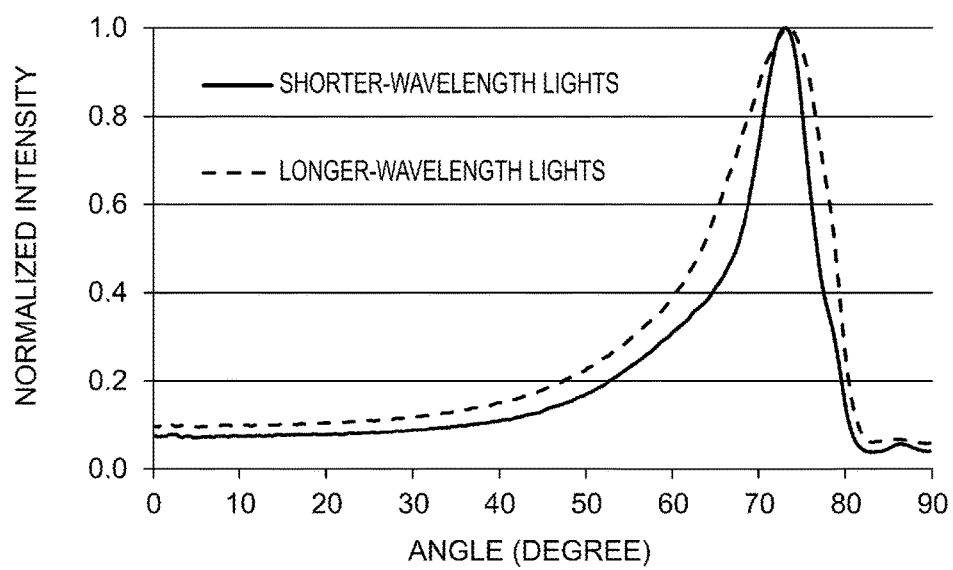
FIG. 11 shows light intensity distribution in the case of the combination of the light source shown in FIG. 1 and the optical element of Comparative Example 2.

FIG. 11 shows light intensity distribution in the case of the combination of the light source shown in FIG. 1 and the optical element of Comparative Example 2. The horizontal axis of FIG. 11 represents angle θ which a direction forms with the central axis AX. The vertical axis of FIG. 11 represents a relative value of intensity of light which is emitted in the direction which forms angle θ with the central axis AX. The solid line in FIG. 11 represents relative intensity of lights having wavelength below 500 nanometers (shorter-wavelength lights). The dashed line in FIG. 11 represents relative intensity of lights having wavelength at and above 500 nanometers (longer-wavelength lights). The relative intensity is determined such that the maximum intensity is represented as 100%.

When FIG. 10 and FIG. 11 are compared with each other, a difference in intensity between shorter-wavelength lights and longer-wavelength lights in FIG. 11 concerning Comparative Example 2 is larger than that in FIG. 10. The difference between both groups of lights is remarkably large around θ of 65 degrees. When the difference between both groups of lights is large, a difference in color appears. More specifically, when the difference between both groups of lights is large around θ of 65 degrees and intensity of longer-wavelength lights is larger as shown in FIG. 11, the lights become reddish around θ of 65 degrees.

Thus, the optical element of Example 2 is capable of reducing a difference in color more effectively than that of Comparative Example 2.

Example 3

In the present example, the distance T between P0 and O2 is as below.

$T=5.555$ mm

The distance h between P0 and O1 is as below.

$h=4.555$ mm

The shape of the exit surface 103 is represented by a spline curve of order 3 for the following group of points. A spline curve of order 3 is a smooth curve which passes through given plural control points and which is formed by third-degree polynomials, each of which interpolates each segment between two adjacent control points and is determined to be continuous at the control points.

Table 7 shows the group of points of the spline curve of order 3. "r" represents distance from the central axis AX. "$r_{max}$" represents the maximum value of r in the area of the exit surface, and $r_{max}=9.25$ (mm). "z" represents coordinate in the direction of the central axis AX with respect to the point of intersection O2 of the exit surface with the central axis AX.

TABLE 7

| r | z |
|---|---|
| 0.000 | 0.000 |
| 0.100 | 0.003 |
| 0.200 | 0.010 |
| 0.300 | 0.023 |
| 0.400 | 0.039 |
| 0.500 | 0.058 |
| 1.000 | 0.175 |
| 2.000 | 0.387 |
| 3.000 | 0.486 |
| 4.000 | 0.455 |
| 5.000 | 0.296 |
| 6.000 | 0.008 |
| 7.000 | −0.431 |
| 7.025 | −0.442 |
| 7.050 | −0.458 |
| 7.075 | −0.474 |
| 7.100 | −0.486 |
| 7.125 | −0.498 |
| 7.150 | −0.514 |
| 7.175 | −0.531 |
| 7.200 | −0.544 |
| 7.225 | −0.556 |
| 7.250 | −0.574 |
| 7.275 | −0.591 |
| 7.300 | −0.604 |
| 7.325 | −0.618 |
| 7.350 | −0.636 |

TABLE 7-continued

| r | z |
|---|---|
| 7.375 | −0.654 |
| 7.400 | −0.668 |
| 7.425 | −0.682 |
| 7.450 | −0.701 |
| 7.475 | −0.720 |
| 7.500 | −0.735 |
| 7.525 | −0.750 |
| 7.550 | −0.770 |
| 7.575 | −0.790 |
| 7.600 | −0.806 |
| 7.625 | −0.822 |
| 7.650 | −0.843 |
| 7.675 | −0.864 |
| 7.700 | −0.881 |
| 7.725 | −0.898 |
| 7.750 | −0.920 |
| 7.775 | −0.942 |
| 7.800 | −0.960 |
| 7.825 | −0.979 |
| 7.850 | −1.002 |
| 7.875 | −1.025 |
| 7.900 | −1.045 |
| 7.925 | −1.064 |
| 7.950 | −1.089 |
| 7.975 | −1.114 |
| 8.000 | −1.134 |
| 8.025 | −1.155 |
| 8.050 | −1.181 |
| 8.075 | −1.207 |
| 8.100 | −1.229 |
| 8.125 | −1.252 |
| 8.150 | −1.279 |
| 8.175 | −1.307 |
| 8.200 | −1.331 |
| 8.225 | −1.355 |
| 8.250 | −1.384 |
| 8.275 | −1.414 |
| 8.300 | −1.440 |
| 8.325 | −1.465 |
| 8.350 | −1.497 |
| 8.375 | −1.529 |
| 8.400 | −1.556 |
| 8.425 | −1.584 |
| 8.450 | −1.617 |
| 8.475 | −1.652 |
| 8.500 | −1.681 |
| 8.525 | −1.711 |
| 8.550 | −1.747 |
| 8.575 | −1.783 |
| 8.600 | −1.815 |
| 8.625 | −1.847 |
| 8.650 | −1.886 |
| 8.675 | −1.925 |
| 8.700 | −1.959 |
| 8.725 | −1.994 |
| 8.750 | −2.036 |
| 8.775 | −2.078 |
| 8.800 | −2.115 |
| 8.825 | −2.153 |
| 8.850 | −2.197 |
| 8.875 | −2.242 |
| 8.900 | −2.283 |
| 8.925 | −2.324 |
| 8.950 | −2.372 |
| 8.975 | −2.420 |
| 9.000 | −2.464 |
| 9.025 | −2.509 |
| 9.050 | −2.560 |
| 9.075 | −2.613 |
| 9.100 | −2.660 |
| 9.125 | −2.708 |
| 9.150 | −2.764 |
| 9.175 | −2.821 |
| 9.200 | −2.872 |
| 9.225 | −2.925 |
| 9.250 | −2.985 |

Figure 12:
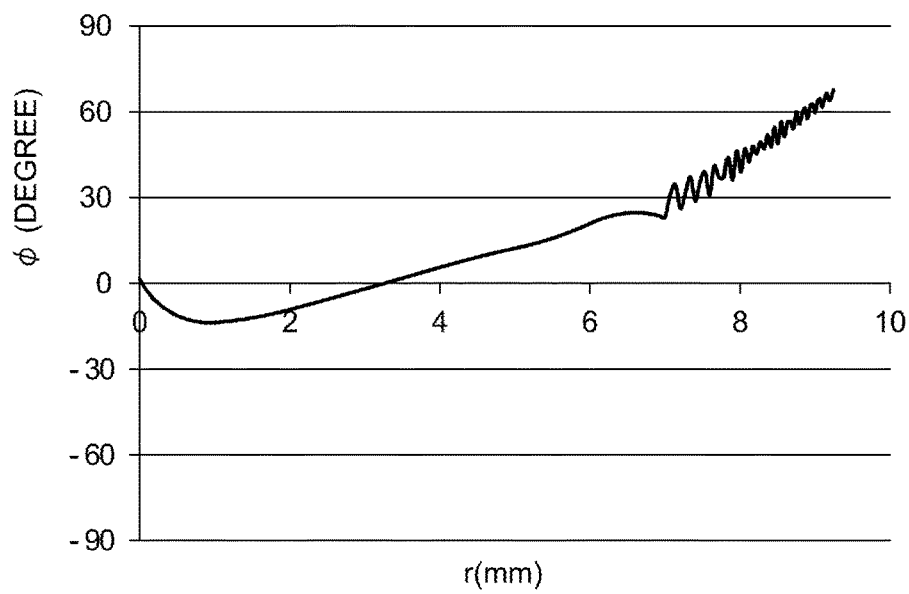
FIG. 12 represents a relationship between "r" and "φ" of the optical element of Example 3.

FIG. 12 represents a relationship between "r" and "φ" of the optical element of Example 3. The horizontal axis in FIG. 12 represents distance "r" from the optical axis AX. The vertical axis in FIG. 12 represents angle "φ" which the normal to the exit surface 103 at a point at a distance of "r" from the central axis AX forms with the central axis AX. In FIG. 2, "θr" and "φ" are designated as positive when measured clockwise with respect to the optical axis AX. "φ" in FIG. 12 is that in an area of the exit surface, through which a ray that is emitted from the point P0 and travels at an a positive angle of "θr".

In FIG. 12, when r=0, φ=0. In the range of 0<r<0.95, φ monotonously decreases with r.

In the range of $6.5 \leq r \leq r_{max}$, φ increases oscillationally with r. The period p of the oscillation ranges from 0.1 to 0.2. When the value of p normalized by $r_{max}$ is represented as p', p' ranges from 0.11 to 0.22. The maximum value of the amplitude of the oscillation, that is, the maximum value of a difference between a local maximum value and a local minimum value of the function φ of r, which are adjacent to each other is 12 degrees. In the range of $6.5 \leq r \leq r_{max}$, there exist at least eighteen local maximum values and at least eighteen local minimum values. The above-described range is called a scattering area of the exit surface 103. The above-described local maximum values and local minimum values are located in the range of $0.5\ r_{max} \leq r$. The above-described local maximum values and local minimum values are positive.

The shape of the light receiving surface 101 is represented by the following equation.

$$z = \frac{cr^2}{1+\sqrt{1-(1+k)c^2r^2}} + \sum_{i=1}^{N} A_i r^i \quad (3)$$

The following relationships hold.

$c=1/R$ $r^2 = x^2 + y^2$

"r" represents distance from the central axis AX. "z" represents coordinate in the direction of the central axis AX with respect to the point of intersection O1 of the light receiving surface with the central axis AX. "c" represents curvature, "R" represents radius of curvature, "k" represents conic constant and "Ai" represents aspheric coefficient.

Table 8 shows numerical values of coefficients and constants of Equation (3) which represents the shape of the light receiving surface of Example 3.

TABLE 8

| | |
|---|---|
| R | −1.1397 |
| k | −0.768 |
| A1 | 0.000 |
| A2 | −0.054 |
| A3 | 0.052 |
| A4 | 0.000 |

Figure 13:
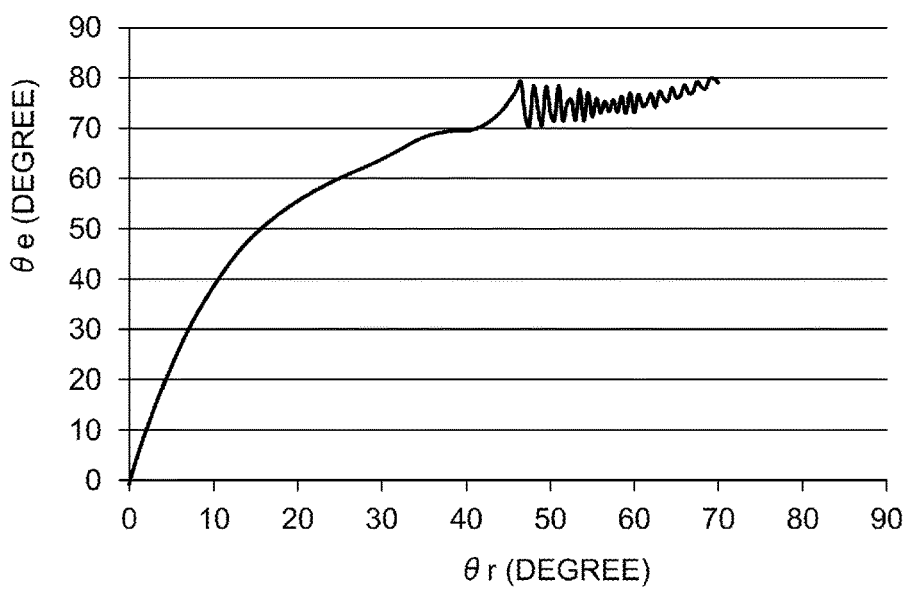
FIG. 13 represents a relationship between "θr" and "θe" of the optical element of Example 3.

FIG. 13 represents a relationship between "θr" and "θe" of the optical element of Example 3. The horizontal axis in FIG. 13 represents the angle θr which the direction of a ray emitted from the point P0 forms with the central axis AX. The vertical axis in FIG. 13 represents the angle θe which the direction of the ray which travels after having been emitted from the point P0 and then having been reflected at the exit surface forms with the central axis AX.

In FIG. 13, when θr=0, θe=0. In the range of 0<θr<40 (degrees), θe monotonously increases with θr. In the range of 40 (degrees)≤θr≤70 (degrees), θe is oscillational as θr increases. The period of the oscillation is 1 to 2 degrees. The maximum value of the amplitude of the oscillation, that is, the maximum value of a difference between a local maximum value and a local minimum value of the function θe of θr, which are adjacent to each other is approximately 10 degrees. In the range of 40 (degrees)≤θr≤70 (degrees), there exist at least eighteen local maximum values and at least eighteen local minimum values. These local maximum values and local minimum values range from 69 degrees to 80 degrees.

Comparative Example 3

In the present comparative example, the distance T between P0 and O2 is as below.

$T=5.555$ mm

The distance h between P0 and O1 is as below.

$h=4.555$ mm

The shape of the exit surface is represented by a spline curve of order 3 for the following group of points.

Table 9 shows the group of points of the spline curve of order 3. "r" represents distance from the central axis AX. "$r_{max}$" represents the maximum value of r in the exit surface, and $r_{max}$=9.25 (mm). "z" represents coordinate in the direction of the central axis AX with respect to the point of intersection O2 of the exit surface with the central axis AX.

TABLE 9

| r | z |
|---|---|
| 0.000 | 0.000 |
| 0.100 | 0.003 |
| 0.200 | 0.010 |
| 0.300 | 0.023 |
| 0.400 | 0.039 |
| 0.500 | 0.058 |
| 1.000 | 0.175 |
| 2.000 | 0.387 |
| 3.000 | 0.486 |
| 4.000 | 0.455 |
| 5.000 | 0.296 |
| 6.000 | 0.008 |
| 7.000 | −0.431 |
| 7.025 | −0.442 |
| 7.050 | −0.458 |
| 7.075 | −0.472 |
| 7.100 | −0.486 |
| 7.125 | −0.500 |
| 7.150 | −0.514 |
| 7.175 | −0.529 |
| 7.200 | −0.544 |
| 7.225 | −0.558 |
| 7.250 | −0.574 |
| 7.275 | −0.589 |
| 7.300 | −0.604 |
| 7.325 | −0.620 |
| 7.350 | −0.636 |
| 7.375 | −0.652 |
| 7.400 | −0.668 |
| 7.425 | −0.684 |
| 7.450 | −0.701 |
| 7.475 | −0.718 |
| 7.500 | −0.735 |
| 7.525 | −0.753 |
| 7.550 | −0.770 |
| 7.575 | −0.788 |
| 7.600 | −0.806 |
| 7.625 | −0.824 |

TABLE 9-continued

| r | z |
| --- | --- |
| 7.650 | −0.843 |
| 7.675 | −0.862 |
| 7.700 | −0.881 |
| 7.725 | −0.900 |
| 7.750 | −0.920 |
| 7.775 | −0.940 |
| 7.800 | −0.960 |
| 7.825 | −0.981 |
| 7.850 | −1.002 |
| 7.875 | −1.023 |
| 7.900 | −1.045 |
| 7.925 | −1.066 |
| 7.950 | −1.089 |
| 7.975 | −1.111 |
| 8.000 | −1.134 |
| 8.025 | −1.157 |
| 8.050 | −1.181 |
| 8.075 | −1.205 |
| 8.100 | −1.229 |
| 8.125 | −1.254 |
| 8.150 | −1.279 |
| 8.175 | −1.305 |
| 8.200 | −1.331 |
| 8.225 | −1.357 |
| 8.250 | −1.384 |
| 8.275 | −1.412 |
| 8.300 | −1.440 |
| 8.325 | −1.468 |
| 8.350 | −1.497 |
| 8.375 | −1.526 |
| 8.400 | −1.556 |
| 8.425 | −1.586 |
| 8.450 | −1.617 |
| 8.475 | −1.649 |
| 8.500 | −1.681 |
| 8.525 | −1.714 |
| 8.550 | −1.747 |
| 8.575 | −1.781 |
| 8.600 | −1.815 |
| 8.625 | −1.850 |
| 8.650 | −1.886 |
| 8.675 | −1.922 |
| 8.700 | −1.959 |
| 8.725 | −1.997 |
| 8.750 | −2.036 |
| 8.775 | −2.075 |
| 8.800 | −2.115 |
| 8.825 | −2.156 |
| 8.850 | −2.197 |
| 8.875 | −2.240 |
| 8.900 | −2.283 |
| 8.925 | −2.327 |
| 8.950 | −2.372 |
| 8.975 | −2.417 |
| 9.000 | −2.464 |
| 9.025 | −2.512 |
| 9.050 | −2.560 |
| 9.075 | −2.609 |
| 9.100 | −2.660 |
| 9.125 | −2.711 |
| 9.150 | −2.764 |
| 9.175 | −2.818 |
| 9.200 | −2.872 |
| 9.225 | −2.928 |
| 9.250 | −2.985 |

The shape of the light receiving surface is represented by Equation (3), and coefficients and constants of Equation (3) are given in Table 8.

In other words, the shape of the light receiving surface of Comparative Example 3 is identical with that of Example 3. Further, the shape of the exit surface of Comparative Example 3 is identical with that of Example 3 except that the shape of the exit surface of Comparative Example 3 is not provided with the scattering area.

Performance Comparison Between Example 3 and Comparative Example 3

Light distribution in the case of a combination of the light source shown in FIG. 1 and the optical element of Example 3 and light distribution in the case of a combination of the light source shown in FIG. 1 and the optical element of Comparative Example 3 are compared with each other to compare performance of Example 3 and that of Comparative Example 3 with each other.

Figure 14:
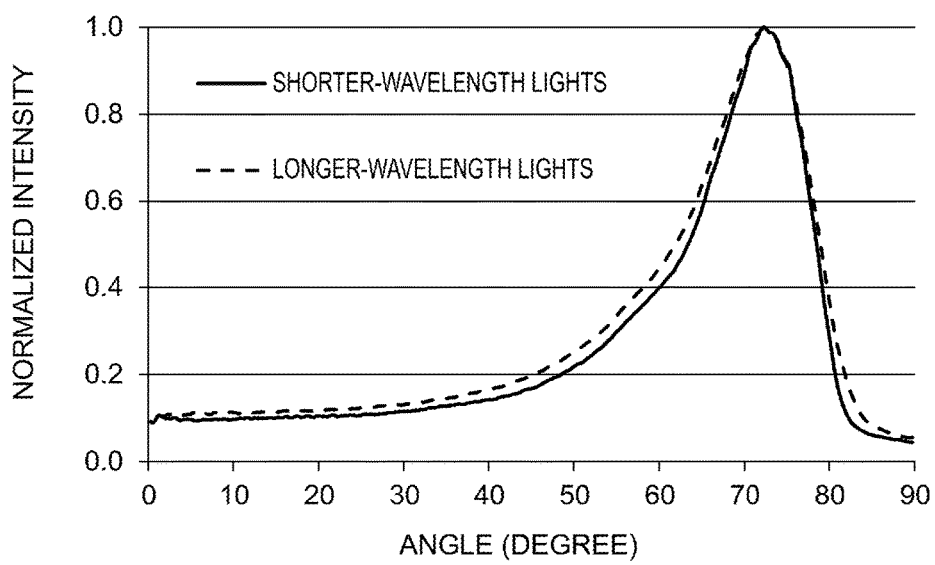
FIG. 14 shows light intensity distribution in the case of the combination of the light source shown in FIG. 1 and the optical element of Example 3.

FIG. 14 shows light intensity distribution in the case of the combination of the light source shown in FIG. 1 and the optical element of Example 3. The horizontal axis of FIG. 14 represents angle θ which a direction forms with the central axis AX. The vertical axis of FIG. 14 represents a relative value of intensity of light which is emitted in the direction which forms angle θ with the central axis AX. The solid line in FIG. 14 represents relative intensity of lights having wavelength below 500 nanometers (shorter-wavelength lights). The dashed line in FIG. 14 represents relative intensity of lights having wavelength at and above 500 nanometers (longer-wavelength lights). The relative intensity is determined such that the maximum intensity is represented as 100%.

Figure 15:
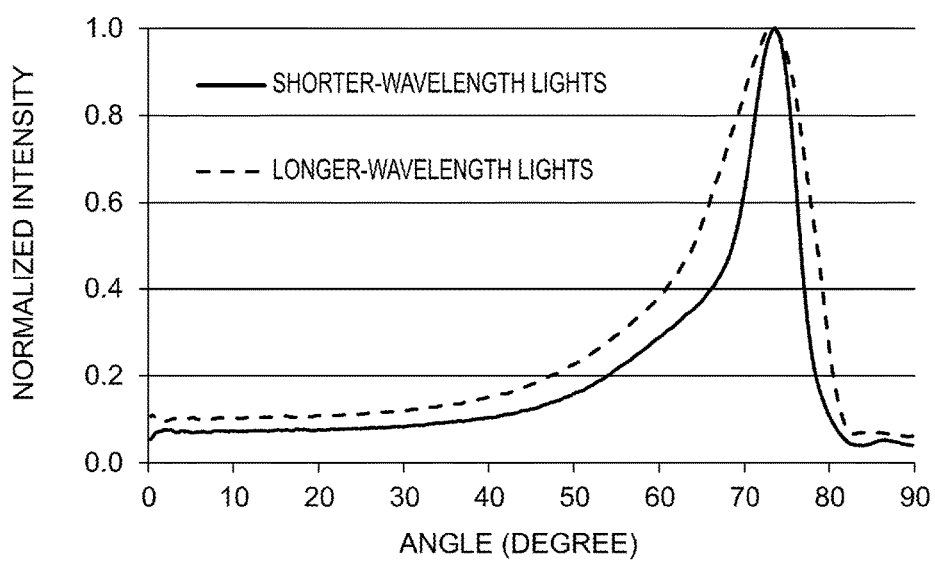
FIG. 15 shows light intensity distribution in the case of the combination of the light source shown in FIG. 1 and the optical element of Comparative Example 3.

FIG. 15 shows light intensity distribution in the case of the combination of the light source shown in FIG. 1 and the optical element of Comparative Example 3. The horizontal axis of FIG. 15 represents angle θ which a direction forms with the central axis AX. The vertical axis of FIG. 15 represents a relative value of intensity of light which is emitted in the direction which forms angle θ with the central axis AX. The solid line in FIG. 15 represents relative intensity of lights having wavelength below 500 nanometers (shorter-wavelength lights). The dashed line in FIG. 15 represents relative intensity of lights having wavelength at and above 500 nanometers (longer-wavelength lights). The relative intensity is determined such that the maximum intensity is represented as 100%.

When FIG. 14 and FIG. 15 are compared with each other, a difference in intensity between shorter-wavelength lights and longer-wavelength lights in FIG. 15 concerning Comparative Example 3 is larger than that in FIG. 14. The difference between both groups of lights is remarkably large around θ of 65 degrees. When the difference between both groups of lights is large, a difference in color appears. More specifically, when the difference between both groups of lights is large around θ of 65 degrees and intensity of longer-wavelength lights is larger as shown in FIG. 15, the lights become reddish around θ of 65 degrees.

Thus, the optical element of Example 3 is capable of reducing a difference in color more effectively than that of Comparative Example 3.

Other Preferable Embodiments

The optical elements of Examples 1 to 3 are symmetric with respect to the central axis AX. In other embodiments, an optical element can be configured such that the exit surface is of different shapes in plural circular sectors around the central axis AX of the optical element. The circular sectors may be of the identical size, such as 4 circular sectors of 90 degrees or 6 circular sectors of 60 degrees, or may be of different sizes. The exit surface in each of the circular sectors may have such a shape as shown in any of Examples 1 to 3, that is, a scattering area. Alternatively, the exit surface only in some of the circular sectors may have a scattering area and the exit surface in the other sectors may not have a scattering area.

According to the above-described embodiments, light distribution can be changed depending on directions which correspond to circular sectors around the central axis AX. For example, more specifically, a difference in color in a specific direction around the central axis AX can be reduced.

It is preferable that the exit surface is provided with a scattering structure for scattering lights in order to form a scattering area. The scattering structure can be microscopic depressions or projections in a spherical or an aspherical shape on a surface, each of the depressions or each of the projections being included in a circle of diameter of less than 1 mm on the surface. Alternatively, the scattering structure can be microscopic depressions or projections in the shape of a conical, a triangular pyramid, a quadrangular pyramid shape on a surface, each of the depressions or each of the projections being included in a circle of diameter of less than 1 mm on the surface. Alternatively, the scattering structure can be a grained surface by roughening, a refracting structure including microscopic curved surfaces or prisms such as a microlens array, or a total-reflecting structure including prisms.

Further, the surface portion of the exit surface may be made of material including a scattering material in order to form a scattering area in the range of $0.5 r_{max} \leq r$ on the exit surface. The scattering material can be acrylic powder, polystyrene particles, silicon powder, silver powder, titanium oxide powder, aluminium powder, white carbon, magnesia oxide, zinc oxide and the like. The surface portion of the exit surface means that of depth up to 0.1 millimeters, for example. By such a scattering material, lights which leave the exit surface are further scattered.

The scattering area of the exit surface may be formed by a shape of the exit surface alone, as shown in Examples 1 to 3. Alternatively, the scattering area of the exit surface may be formed by a scattering material alone, as described above. Further, the scattering area of the exit surface may be formed by a combination of a shape and a scattering material.

What is claimed is:

1. An optical element comprising a light receiving surface which covers a light source arranged on a plane and an exit surface which covers the light receiving surface, the optical element being configured such that lights from the light source passes through the light receiving surface and the exit surface and goes to the outside for illumination, wherein when the central axis of the optical element is designated as an optical axis, the point of intersection of the optical axis with the plane is designated as a point P0, and in a cross section of the optical element, the cross section containing the optical axis and being perpendicular to the plane, an angle which a line connecting the point P0 and a point on the light receiving surface forms with the optical axis is designated as θr, an angle which a normal to the exit surface at a point Q on the exit surface forms with the optical axis is designated as φ, a distance from the optical axis to the point Q is designated as r, the maximum value of distance from the optical axis to a point on the exit surface is designated as $r_{max}$, and a value of θr and a value φ are designated as positive when measured clockwise with respect to the optical axis, the exit surface is configured such that φ has plural local minimum values and plural local maximum values as a function of r in the range of $$0.5 r_{max} \leq r,$$

and the plural local minimum values and the plural local maximum values are positive in an area of the exit surface through which a ray that is emitted from the point P0 and travels at a positive angle of θr passes, and the shape of the exit surface is symmetric with respect to the optical axis, and wherein the exit surface is configured such that a relationship $$\Delta r / r_{max} \leq 0.05$$

is satisfied when the maximum distance of a point on the exit surface is designated as $r_{max}$, and a difference between two values of r which correspond to a local maximum value and a local minimum value which are adjacent to each other among the plural local maximum values and the plural local minimum values is designated as Δr.

2. An optical element according to claim 1, wherein the exit surface is configured such that the number of the plural local minimum values is at least eight and the number of the plural local maximum values is at least eight.

3. An optical element according to claim 1, wherein the exit surface is configured such that a relationship $$\Delta\phi \leq 20 \text{ degrees}$$

is satisfied when a difference between two values of φ which correspond to a local maximum value and a local minimum value which are adjacent to each other among the plural local minimum values and the plural local maximum values is designated as Δφ.

4. An optical element according to claim 3, wherein the exit surface is configured such that a relationship $$\Delta\phi \leq 15 \text{ degrees}$$

is satisfied.

5. An optical element according to claim 1, wherein the exit surface is configured such that a relationship $$0.01 \leq \Delta r_{max}/r_{max} \leq 0.05$$

is satisfied when the maximum value of Δr is designated as $\Delta r_{max}$.

6. An optical element comprising a light receiving surface which covers a light source arranged on a plane and an exit surface which covers the light receiving surface, the optical element being configured such that lights from the light source passes through the light receiving surface and the exit surface and goes to the outside for illumination, wherein when the central axis of the optical element is designated as an optical axis, the point of intersection of the optical axis with the plane is designated as a point P0, the point of intersection of the optical axis with the light receiving surface is designated as O1 and in a cross section of the optical element, the cross section containing the optical axis and being perpendicular to the plane, an angle which a line connecting the point P0 and a point P on the light receiving surface forms with the optical axis is designated as θr, the direction of a ray which leaves the optical element after having traveled from the point P0 to the point P forms with the optical axis is designated as θe, and the point P is moved from the point O1 along the light receiving surface, the optical element is configured such that θe has plural local minimum values and plural local maximum values as a function of θr in the range of $$60 \text{ degrees} \leq \theta e,$$

and the shape of the exit surface is symmetric with respect to the optical axis.

7. An optical element according to claim 6, wherein the optical element is configured such that the maximum value of a difference $\Delta\theta e$ between a local maximum value and a local minimum value which are adjacent to each other among the plural local minimum values and the plural local maximum values of $\theta e$ is 5 degrees or more.

8. An optical element according to claim 7, wherein the optical element is configured such that the maximum value of $\Delta\theta e$ is 15 degrees or less.

9. An optical element according to claim 1, wherein the optical element is divided into circular sectors around the central axis AX and the exit surface has different shapes in the respective circular sectors.

10. An optical element, wherein the optical element is divided into circular sectors around the central axis AX and the exit surface has a shape recited in claim 1 only in some of the circular sectors.

11. An optical element according to claim 1, wherein the surface portion of the exit surface includes a scattering material in the range of $0.5r_{max} \leq r$.

12. An optical element according to claim 6, wherein the optical element is divided into circular sectors around the central axis AX and the exit surface has different shapes in the respective circular sectors.

13. An optical element, wherein the optical element is divided into circular sectors around the central axis AX and the exit surface has a shape recited in claim 6 only in some of the circular sectors.

14. An optical element according to claim 6, wherein the surface portion of the exit surface includes a scattering material in the range of $0.5r_{max} \leq r$.

* * * * *